(12) United States Patent
Nesbitt et al.

(10) Patent No.: US 7,140,601 B2
(45) Date of Patent: Nov. 28, 2006

(54) INDEPENDENT AND INTEGRATED COMPACT AIR-BUMP STOPS

(75) Inventors: Thomas R. Nesbitt, Ann Arbor, MI (US); Bryan J. Kudela, Catheys Valley, CA (US)

(73) Assignees: General Motors Corporation, Detroit, MI (US); Niwot Corporation, Longmont, CO (US)

( * ) Notice: Subject to any disclaimer, the term of this patent is extended or adjusted under 35 U.S.C. 154(b) by 0 days.

(21) Appl. No.: 10/913,722

(22) Filed: Aug. 6, 2004

(65) Prior Publication Data

US 2006/0027954 A1    Feb. 9, 2006

(51) Int. Cl.
*F16F 5/00* (2006.01)
(52) U.S. Cl. ............... 267/64.13; 267/64.25; 267/64.26; 267/64.28; 267/120; 267/124; 188/269; 188/282.1
(58) Field of Classification Search .......... 188/33, 188/269, 280, 281, 282.1, 284, 297, 316, 188/317, 318; 267/3, 64.11, 64.13, 64.15, 267/64.25, 64.26, 64.28, 113, 116, 118, 120, 267/121, 124, 139, 195, 217, 219, 220; 105/198.3
See application file for complete search history.

(56) References Cited

U.S. PATENT DOCUMENTS

| | | | | |
|---|---|---|---|---|
| 2,701,714 A | * | 2/1955 | Hardwood, Jr. .......... 267/64.23 |
| 2,737,301 A | * | 3/1956 | Thornhill ................. 267/64.11 |
| 2,856,035 A | * | 10/1958 | Rohacs ....................... 188/269 |
| 2,861,795 A | * | 11/1958 | Blake ......................... 267/225 |
| 3,115,349 A | * | 12/1963 | Lerg ........................... 267/219 |
| 3,164,381 A | * | 1/1965 | Tuczek ..................... 267/64.15 |
| 3,773,147 A | * | 11/1973 | Wiebe ......................... 188/33 |
| 4,185,719 A | * | 1/1980 | Farris et al. ................. 188/33 |
| 6,415,895 B1 | | 7/2002 | Marking et al. ............ 188/287 |

* cited by examiner

*Primary Examiner*—Thomas Williams
(74) *Attorney, Agent, or Firm*—Laura C. Hargitt

(57) ABSTRACT

A compact air-bump stop (jounceshock) provides improved motor vehicle suspension system accommodation of jounce and rebound than is provided than by a conventional shock absorber, bump cushion and/or air-bump stop. In an independent jounceshock, a primary shell and a secondary shell are reversibly collapsible into each other, and a valved piston demarcates a primary chamber within the primary shell and a secondary chamber within the secondary shell, both of which being filled with a mixture of pressurized gas, preferably nitrogen, and oil. The valving of the valved piston allows for selectively unidirectional, metered movement of the oil therethrough in concert with the direction of movement of the secondary shell with respect to the primary shell. In an integrated jounceshock, a compact air-bump stop is integrated with a shock absorber.

5 Claims, 5 Drawing Sheets

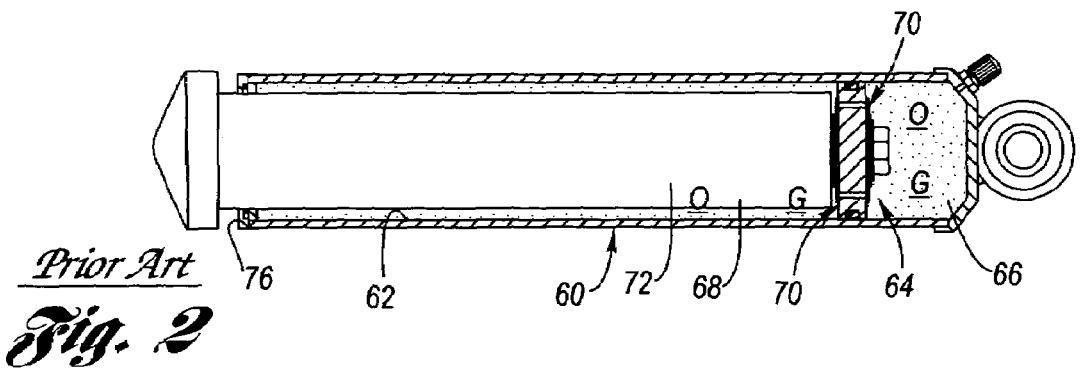
*Prior Art*
*Fig. 2*
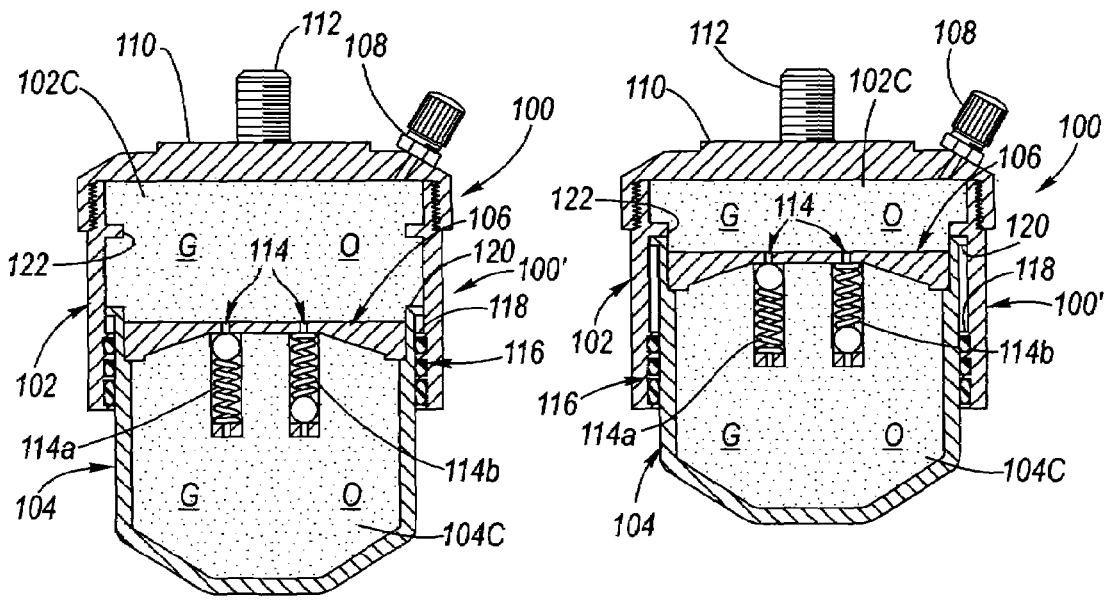
*Fig. 3A*        *Fig. 3B*
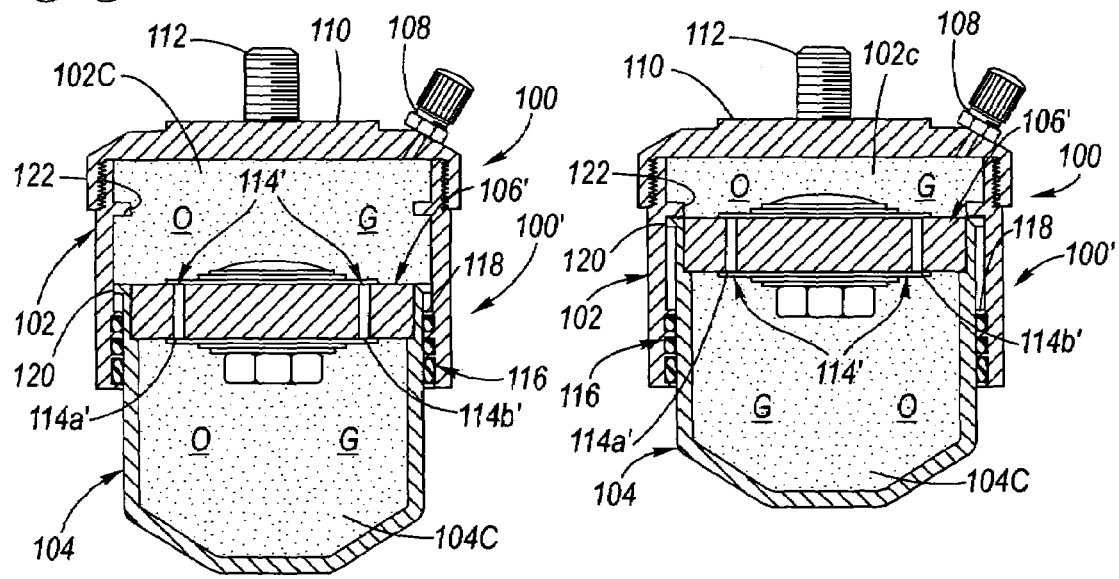
*Fig. 4A*        *Fig. 4B*

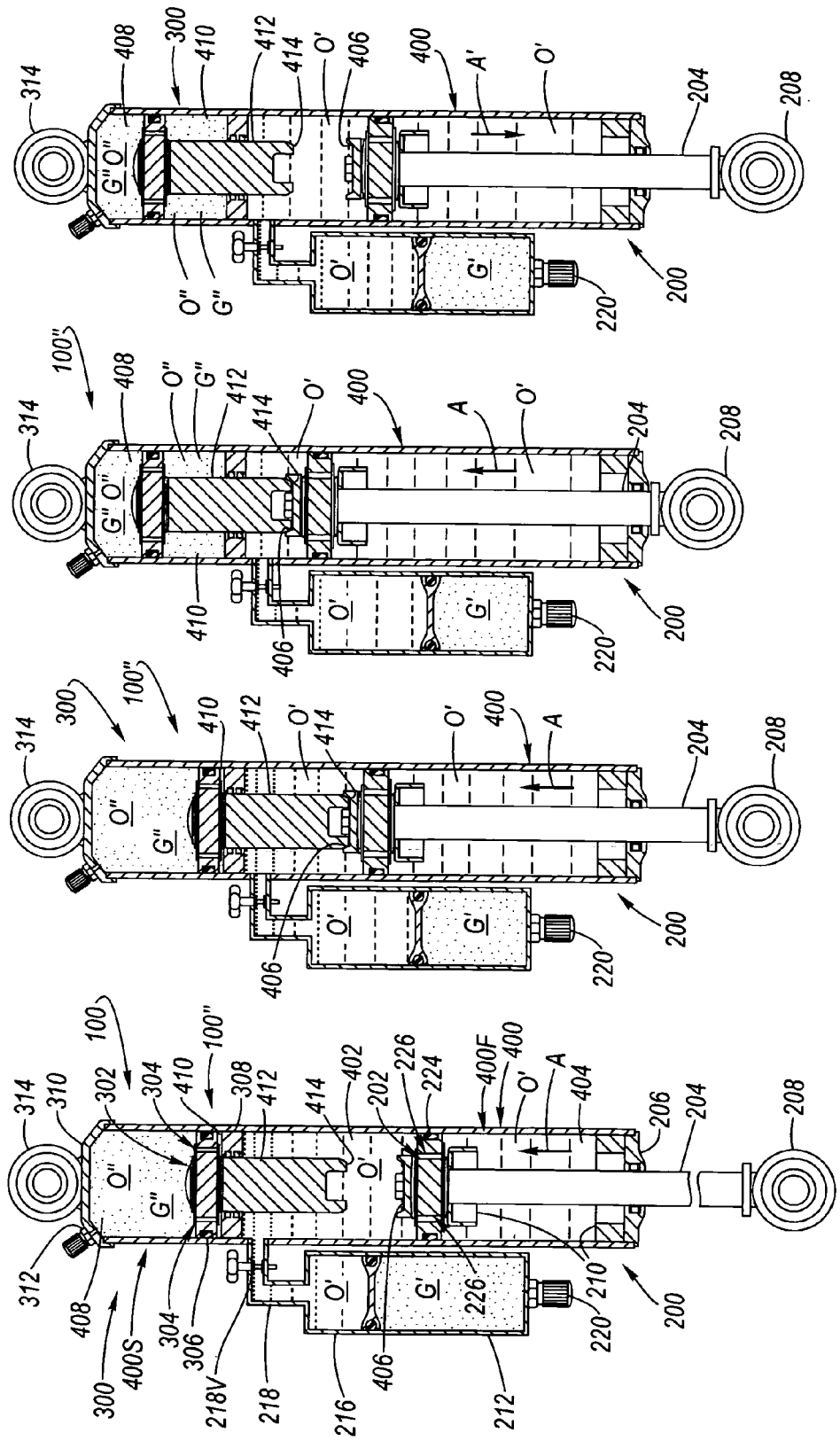

US 7,140,601 B2

INDEPENDENT AND INTEGRATED COMPACT AIR-BUMP STOPS

TECHNICAL FIELD

The present invention relates to air-bump stops (also referred to as "bumpshocks") used conventionally for off-road applications of motor vehicles, and is further related to conventional automotive shock absorbers and conventional automotive bump cushions. More particularly, the present invention relates to: 1) an independent compact air-bump stop (herein also referred to as an independent "jounceshock") which substitutes for, and enhances the function of, a conventional bump cushion, and 2) an integrated compact air-bump stop (herein also referred to as an integrated "jounceshock") in the form of a shock absorber integrated with a compact air-bump stop, obviating need of a conventional bump cushion.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the frame of the vehicle. In either jounce or rebound, a spring (ie., coil, leaf, torsion, etc.) is incorporated at the wheel in order to provide a resilient response to the respective vertical movements with regard to the vehicle frame. However, in order to prevent wheel bouncing and excessive vehicle body motion, a shock absorber is placed at the wheel to dampen wheel bounce. Additionally, when the limit of jounce is encountered, it is customary to provide a maximum jounce impact absorber in the form of a bump cushion.

Referring now to FIGS. 1 through 1B, components of a conventional suspension system 10 are depicted which allow for jounce and rebound at a wheel of the subject motor vehicle 12.

Firstly with regard to FIG. 1, a control arm 14 is pivotally mounted with respect to the frame 16, wherein, in the depicted example, a torsion spring 18 is utilized to provide resilient response for the jounce and rebound of the control arm relative to the frame. To provide control over bounce, a shock absorber 20 is connected pivotally at one end to the frame 16 and connected pivotally at the other end to the control arm 14. To provide cushioning in the event a maximum jounce occurs, a bump cushion 22 is mounted to the frame 16 which is resiliently compressed by movement of the control arm as jounce approaches its maximum.

Referring next to FIG. 1A, the internal components and operational aspects of a conventional shock absorber 20' (a remote reservoir high pressure gas type shock absorber being shown merely by way of example) can be understood. A valved piston 30 is reciprocably movable within a shock cylinder 32. A shock rod 34 is attached to the valved piston 30 and is guided by a shock rod guide 36 at one end of the shock cylinder 32. Below the valved piston 30 and above the shock rod guide 36 is a mutually interacting rebound limiter 38. The instantaneous position of the valved piston 30 within the shock cylinder 32 defines a first interior portion 32F and a second interior portion 32S of the interior of the shock cylinder. In the example depicted at FIG. 1A, the pressurization in the first and second interior portions 32F, 32S is provided by an oil O which is pressurized by pressurized gas, preferably nitrogen, G acting on a divider piston 40 of an oil reservoir cylinder 42, wherein a tube 44, including a base valve 44V, connects the oil between the oil reservoir cylinder and the first interior portion. In operation, as the control arm undergoes jounce, the oil is displaced from the first interior portion into the oil reservoir cylinder, causing the pressure of the nitrogen gas to increase as its volume decreases and thereby causing an increased hydraulic pressure on the valved piston 30 in a direction toward the shock rod guide. Oil is able to directionally meter through valving 46 of the valved piston 30 in a manner which provides damping.

Referring next to FIG. 1B, the internal structure of a conventional bump cushion 22 can be understood. An optional skin 50 of a pliant plastic material may (or may not) overlay an interior of resilient elastomeric material 52, which may be for example a rubber, rubber-like material, or micro-cellular urethane. In operation as the control arm approaches maximum jounce, the bump cushion 22 compresses, delivering a reaction force on the control arm which increases with increasing compression so as to minimize the severity of impact of the control arm with respect to the frame at the limit of jounce. Immediately following the jounce, the rebound involves the energy absorbed by the compression of the conventional bump cushion being delivered resiliently back to the suspension.

In the art of motor vehicle off-road racing, it is known (for at least the past 15 years) to replace a conventional bump cushion with a device which better accommodates extremes of control arm jounce, known as an "air-bump stop" or "bumpshock".

As depicted by way of exemplification at FIG. 2, a conventional air-bump stop 60 has an elongated cylinder 62 and a valved piston 64 which is reciprocably movable within the cylinder. The valved piston 64 demarcates a primary chamber 66 and a secondary chamber 68, which mutually communicate through the valving 70 of the valved piston. A rod 72 is attached to the valved piston 64 and is guided by a rod seal 74 at the terminous of the secondary chamber 68 and a rod guide 76 at one end of the cylinder 62. Both the primary and secondary chambers 66, 68 are pressurized by a pressurized gas G, most preferably nitrogen, which is mixed with oil O. In operation of the example depicted at FIG. 2, as a control arm undergoes jounce, the piston 64 moves into the primary chamber 66. As this occurs, oil O is metered through the valving 70 at a predetermined flow rate based upon the pressure of the piston applied by the control arm jounce, with the consequence that the gas in the primary chamber 66 increases in pressure rapidly which pressure on the piston reacts against the jounce. Additionally, an "air spring" function due to the total pressure within the primary and secondary chambers acts on the area of the rod 72 to provide an exponential force as related to rod movement into the cylinder.

What remains needed in the art is an improved motor vehicle suspension system in which better accommodation of jounce and rebound is provided than by a conventional shock absorber, conventional bump cushion and/or conventional air-bump stop.

SUMMARY OF THE INVENTION

The present invention is a compact air-bump stop (herein also referred to as a "jounceshock") which provides an improved motor vehicle suspension system with better accommodation of jounce and rebound than that provided by a conventional shock absorber, conventional bump cushion and/or conventional air-bump stop.

In a first application of a compact air-bump stop (jounceshock) according to the present invention, an independent compact air-bump stop (an independent jounceshock) is provided which, for a preferred example, substitutes for a conventional bump cushion. The independent jounceshock includes a primary shell and a secondary shell which is reciprocally movable into the primary shell. The secondary shell carries a valved piston which demarcates a primary chamber within the primary shell and a secondary chamber within the secondary shell, both of which being filled with pressurized gas, preferably nitrogen, mixed with oil. The valving of the valved piston allows for selectively directional, metered movement of the oil therethrough responsively to the direction of movement of the secondary shell with respect to the primary shell.

In operation, as a maximum jounce is approached, the decreasing distance between the control arm and the frame compresses the secondary shell into the primary shell (analogously as to how the conventional bump cushion would compress under similar conditions). As a result, as the primary chamber volume decreases, oil is metered through the valving of the valved piston so to thereby provide damping, and the pressure of the gas in the primary and secondary chambers increases, typically exponentially, such as to reduce the severity of the impact when the maximum jounce occurs.

In this regard, it should be noted that bidirectional damping (not available from a conventional bump cushion) is provided, in which case the rebound following the jounce involves damping of the stored energy so that it does not return to the suspension because of a lag in configurational restoration travel of the secondary shell. In this regard, a lag in the rate of configurational restoration travel in relation to a rate of suspension rebound travel serves to isolate the suspension from energy return by the independent jounceshock, providing an absence of "pushing" on the suspension during rebound (a critical attribute to bumpshocks). Thus, the suspension forces applied to the control arm and the energy management during the jounce and rebound are much improved over that offered by a conventional bump cushion.

In a second application of a compact air-bump stop (jounceshock) according to the present invention, an integrated air-bump stop (integrated jounceshock) is provided which consists of a shock absorber component integrated with a compact air-bump stop component (jounceshock component), wherein the shock absorber component replaces and enhances the role of a conventional shock absorber arid, under a predetermined mutual interaction, the jounceshock component enhancingly replaces the role of a conventional bump cushion.

A cylinder is provided, wherein within a first section thereof is situated the shock absorber component and at a second section thereof is situated the jounceshock component. Connected to a valved first piston of the shock absorber component is a jounceshock rod seat. Connected to a valved second piston of the jounceshock component is a jounceshock rod, which terminates in a jounceshock rod abutment structured for being seatingly received into the jounceshock rod seat.

In operation of the integrated jounceshock, the shock absorber component operates as a shock absorber in the general manner delineated above. In the event jounce becomes extreme, the jounceshock rod seat will abut the jounceshock rod abutment, causing the jounceshock component to commence operation in a manner analogous to a jounceshock as described hereinabove such as to obviate need of a conventional bump cushion in the event the extreme jounce becomes a maximum jounce.

In both applications of the compact air-bump stop (jounceshock), the jounceshock has the operational aspect of an air spring with damping. The closed system of the jounceshock provides exponential force as a function of decreasing position during jounce and is damped and uncoupled during rebound. The resulting suspension performance during jounce and rebound is profound with regard to vehicle capacity and control in high energy terrain inputs.

Accordingly, it is an object of the present invention to provide a device which provides for an improved motor vehicle suspension system in which better accommodation of jounce and rebound is provided than by a conventional shock absorber, conventional bump cushion and/or conventional air-bump stop.

This and additional objects, features and advantages of the present invention will become clearer from the following specification of a preferred embodiment.

BRIEF DESCRIPTION OF THE DRAWINGS

FIG. 2 is a sectional view of a conventional air-bump stop.

FIGS. 3A and 3B are sectional views of a first embodiment of a compact air-bump stop in the form of an independent jounceshock according to the present invention which may substitute for a conventional bump cushion, wherein a first form of valved piston is depicted.

FIGS. 4A and 4B are sectional views of the first embodiment of a compact air-bump stop in the form of an independent jounceshock according to the present invention which may substitute for a conventional bump cushion, wherein a second form of valved piston is depicted.

FIGS. 6A through 6D depict sectional views of a second embodiment of a compact air-bump stop in the form of an integrated jounceshock according to the present invention, showing sequential stages of operation.

DESCRIPTION OF THE PREFERRED EMBODIMENT

Figure 1:
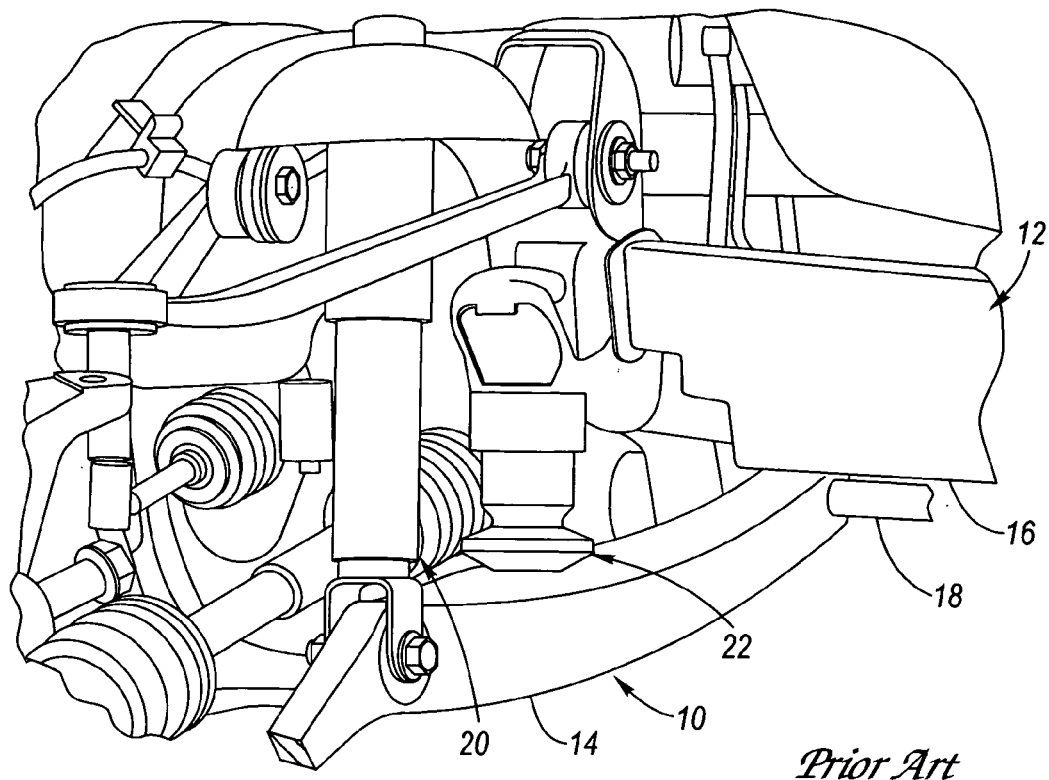
FIG. 1 is a perspective view of a conventional suspension system, including a control arm, a frame, a spring, a conventional shock absorber and a conventional bump cushion.
Figure 1A:
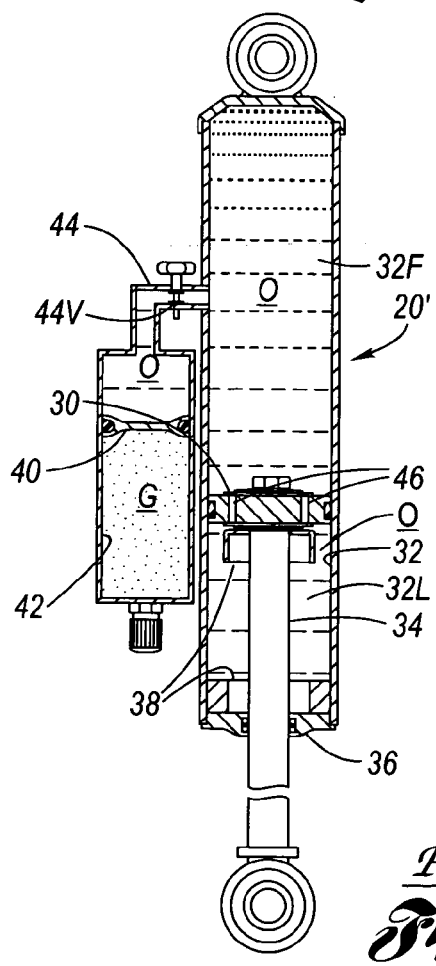
FIG. 1A is a sectional view of a conventional shock absorber.
Figure 1B:
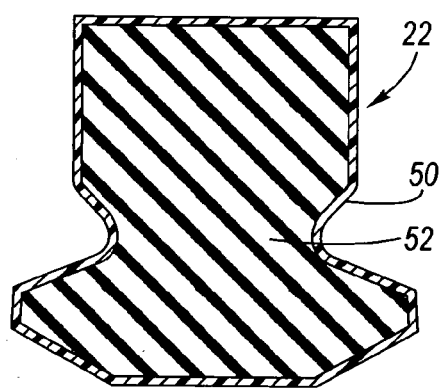
FIG. 1B is a sectional view of a conventional bump cushion.

Referring now to the Drawing, FIGS. 3A through 8 depict various aspects of structure and functional application of a compact air-bump stop (herein also referred to as a "jounceshock") 100 according to the present invention. The jounceshock 100 is essentially an air spring with damping control. The closed pressurized system thereof provides exponential increase in force with change in position characteristics during jounce of a control arm, and is damped and uncoupled during rebound of the control arm. The resulting performance impact is profound with regard to motor vehicle jounce capacity and suspension control in high energy terrain inputs. Additional benefits for on-road use in various performance areas include roll control, gross vehicle motion control, reduced ride rate, and safety. The inherent ability to provide extreme jounce capacity reserves promotes significantly reduced ride rates for both cars and trucks during nominal use, while allowing completely effective performance gains in higher jounce energy level situations.

Referring now to FIGS. 3A through 5, a jounceshock 100 is depicted in the form of an independent compact air-bump stop, hereinafter referred to as an independent jounceshock, 100' which is preferably intended to replace a conventional bump cushion of a motor vehicle suspension, utilizing similar suspension real estate, while adding significant suspension performance improvements thereover.

The independent jounceshock 100' includes a cup-shaped primary shell 102 and a cup-shaped secondary shell 104, wherein the secondary shell is reciprocably movable, contractably into, and expansively out from, the primary shell. The secondary shell 104 has connected thereto, in sealing relation a valved piston 106, 106', wherein the valved piston demarcates a primary chamber 102C within the primary shell 102 and a secondary chamber 104C within the secondary shell 104. Both the primary and the secondary chambers 102C, 104C are filled with a pressurized gas G, preferably nitrogen, mixed with oil O. The primary shell 102 includes a threadably connected (or other connecting modality, such as welding) end cap 110 to which is connected a suspension mounting stud 112, or other mounting modality. An optional gas fill valve 108 may be provided in the end cap 110, or alternatively on the second shell, which allows for selective pressurization of the gas G; alternatively, the pressurized gas may be provided one time only during manufacture.

The valving 114, 114' of the valved piston 106, 106' allows for selective unidirectional, metered movement of oil O therethrough, the direction of flow being in concert with the direction of movement of the secondary shell 104 with respect to the primary shell 102. In this regard, FIGS. 3A and 3B depict a first valving 114 in which a one way valve 114a allows oil O to flow only from the primary chamber 102C to the secondary chamber 104C, and in which another one way valve 114b allows oil O to flow only from the secondary chamber 104C to the primary chamber 102C. By way of example, the first valving are one-way spring-loaded ball and ball seat valves. In this regard further, FIGS. 4A and 4B depict a second valving 114' in which a one way valve 114a' allows oil O to flow only from the primary chamber 102C to the secondary chamber 104C, and in which another one way valve 114b' allows oil O to flow only from the secondary chamber 104C to the primary chamber 102C. By way of example, the second valving are conventional upper and lower deflected disk valves, which are well known in the art.

In order that the pressure of the gas G be maintained inside the primary and secondary chambers 102C, 104C even as the secondary shell 104 contracts into the primary shell 102, a conventional set of bearings and seals 116 is located at the moving interface between the primary and secondary shells. Since the primary and secondary shells 102, 104 tend to separate under the pressure of the gas G, an annular stop ledge 118 of the primary shell interferingly abuts an annular stop lip 120 of the secondary shell to prevent further expansion when the primary and secondary shells are at maximum allowed separation, as shown at FIGS. 3A and 4A. An annular travel stop 122 of the primary shell 102 abuts the annular stop lip 120 to define a maximum extent of contraction of the secondary shell 104 into the primary shell.

Figure 5:
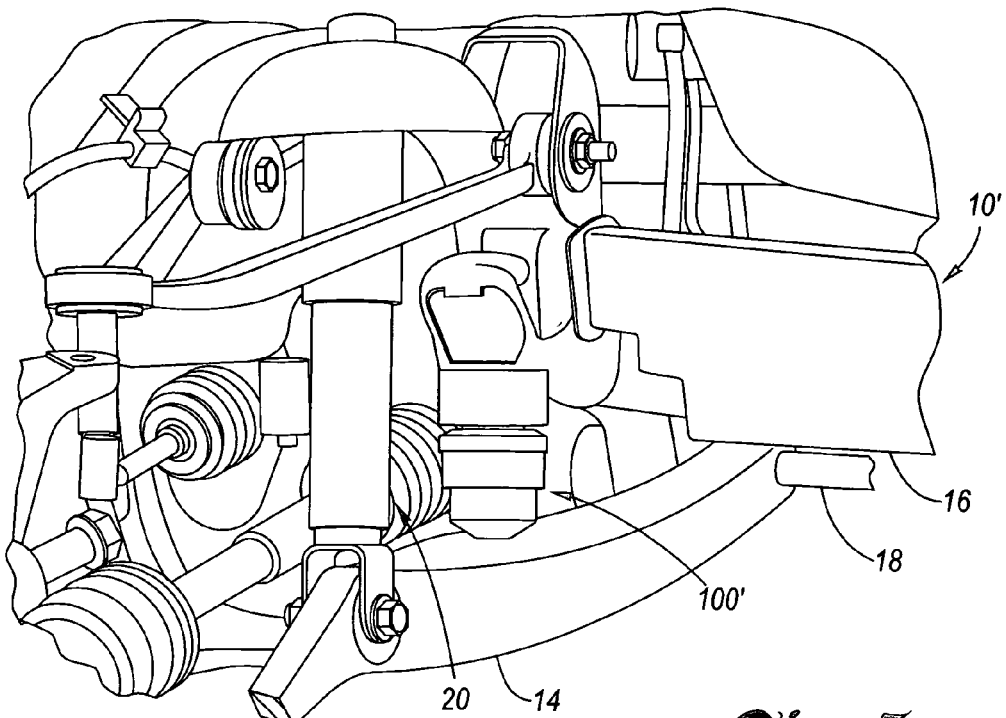
FIG. 5 is a perspective view of a suspension system, including a control arm, a frame, a spring, a conventional shock absorber and independent jounceshock according to the present invention.

In operation of the independent jounceshock 100' form of the compact air-bump stop 100 according to the present invention, the independent jounceshock is located in a motor vehicle suspension at, for example, points where a conventional bump cushion would be conventionally located. For example as depicted at FIG. 5, a suspension system 10' includes a control arm 14 pivotally connected to a frame 16, a conventional shock absorber 20, a spring 18, and the independent jounceshock 100'. In the event that the motor vehicle suspension encounters a maximum jounce, as the maximum jounce is approached, the decreasing distance between the control arm and the frame of the suspension causes compression of the secondary shell 104 into the primary shell 102 (see sequentially FIG. 3A to FIG. 3B and sequentially FIG. 4A to FIG. 4B). As a result, oil O is metered through the valving 114, 114' of the valved piston 106, 106' from the primary chamber to the secondary chamber, such as to provide damping which depends upon the rate by which the distance between the control arm and the frame is decreasing, while the pressure of the gas G in the primary and secondary chambers is increasing, typically exponentially or parabolically until travel stops, thereby reducing the severity of the maximum jounce impact when maximum jounce occurs. Daring rebound of the control arm, the oil rate of reflow from the secondary chamber to the primary chamber is such that the potential energy of the compressed independent jounceshock is damped, whereby it does not return the energy to the suspension because the control arm can move in rebound at a faster rare than the compressed independent jounceshock can expand, resulting in a lag in the rate of configurational restoration travel as compared to the suspension rebound rate. As a result, the forces applied to the control arm and the energy management during the jounce and rebound are much improved over that offered by a conventional bump cushion.

It should be noted that the size and shape of the primary and secondary chambers may be other than that shown, being a function of particular motor vehicle capacity requirements. For example, a light truck application may utilize a stroke (movement of the secondary shell into the primary shell) of one inch or less. Additionally, light trucks and SUV's with intended "off-road" capability will utilize relatively higher capacity primary and secondary chambers than those which would be utilized by cars. Also, the connections to the frame and control arm may be configured to suit a particular application, wherein it is desired to utilize conventional bumper cushion mounting locations and the associated structural support and spacing accommodations. In this regard, the independent jounceshock according to the present invention provides reduced mass versus conventional air-bump stops and allows for simplified sizing strategies for "off-the-shelf" product series availability, as well as considerable cost reduction due to its compact and simplified configuration.

Figure 7:
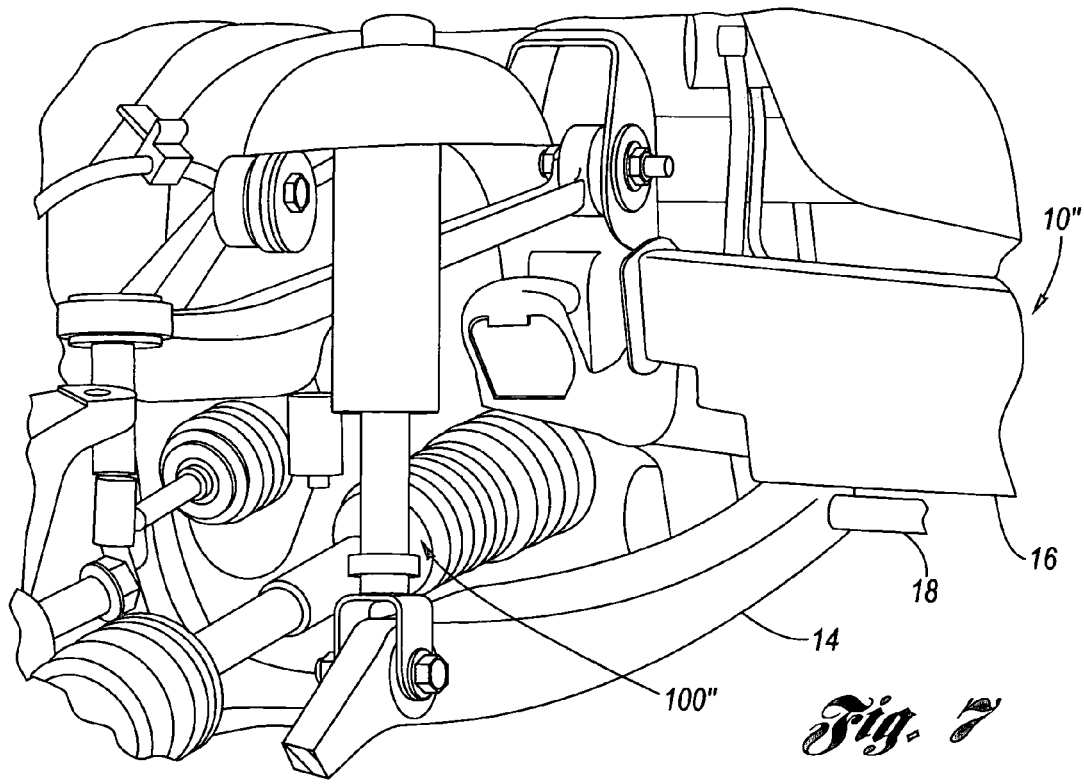
FIG. 7 is a perspective view of a suspension system, including a control arm, a frame, a spring and integrated jounceshock according to the present invention.

Referring now to FIGS. 6 through 7, a second jounceshock 100 is depicted in the form of an integrated compact air-bump stop, hereinafter referred to as an integrated jounceshock 100" which is preferably intended to obviate a conventional bump cushion of a motor vehicle suspension, wherein a shock absorber component 200 thereof serves the role of a conventional shock absorber, and wherein, under a predetermined mutual interaction, a jounceshock component 300 thereof enhancingly replaces a conventional bump cushion. A jounceshock cylinder 400, which preferably, but not necessarily, has a constant interior cross-section, integrates the shock absorber and jounceshock components 200, 300.

Referring firstly with particularity to FIG. 6A, structural aspects of the shock absorber and jounceshock components 200, 300 will be detailed.

With regard firstly to the shock absorber component 200, a valved first piston 202 is reciprocally movable within a first section 400F of the jounceshock cylinder 400. A shock rod 204 is attached to a first side of the valved first piston 202. The shock rod 204 is guided by a shock rod guide 206 located at the end of the first section 400F of the jounceshock cylinder 400 and terminates at a first connection member 208, which is preferably, and not necessarily, a pivot bearing. On a first side of the shock piston 202 and facing the shock rod guide 206 is an optional mutually interacting rebound limiter 210. The instantaneous position of the valved first piston 202 within the first section 400F of the jounceshock cylinder 400 defines a first interior portion 402 and a second interior portion 404 of the interior of the first section 400L. By way of exemplification and not limitation, the pressurization within the first and second interior portions 402, 404 is provided by an oil O' which is pressurized by pressurized nitrogen gas G' of a gas repository 212 acting on a divider piston 214 of an oil reservoir cylinder 216, wherein a tube 218, including an optional adjustable metering valve 218V, connects the oil between the oil reservoir cylinder and the first interior portion.

Attached to a second side of the valved first piston 202 (opposite the aforementioned first side thereof) is a jounceshock rod seat 406. An optional first fill valve 220 provides a port for providing entry of the pressurized gas G' into the gas repository 212. A conventional set of bearings and seals 224 is located at the moving interface between the shock piston 202 and the jounceshock cylinder 400. As the valved first piston 202 moves, oil O' is able to directionally meter through valving 226 (as for example of the type of valving 114, 114' depicted respectively at FIGS. 3A and 4A) of the valved first piston in a manner which provides damping.

With regard secondly to the jounceshock component 300, a valved second piston 302 is reciprocally movable within a second section 400S of the jounceshock cylinder 400. The valved second piston 302 demarcates a primary chamber 408 and a secondary chamber 410 of the jounceshock cylinder 400, which selectively communicate with each other through valving 304 of the valved piston, wherein the valving is one-way, as for example identical to that described with regard to FIGS. 3A through 4B per the valving 114, 114' (valving 114' being shown merely by way of exemplification). A conventional set of bearings and seals 306 is located at the moving interface between the valved piston 302 and the jounceshock cylinder 400. A jounceshock rod 412 is attached to a first side of the valved second piston 302. The jounceshock rod 412 terminates in a jounceshock rod abutment 414 which is self locating, and provides a stabilized seating interface with the jounce shock rod seat 406 when in abutment therewith. Both the primary and secondary chambers 408, 410 are pressurized by a pressurized gas G", most preferably nitrogen, which is mixed with oil O". An annular stop 308 is affixed to the jounceshock cylinder 400 which serves not only to provide an abutment which defines a nominal maximum travel location (as shown at FIG. 6A) of the valved second piston, but also as a bearing guide for the jounceshock rod. An end cap 310 is threadably (or by another modality) connected in sealing relation to an end of the jounceshock cylinder 400. The end cap 310 may carry an optional second gas fill valve 312 for introducing the pressurized gas G" into the primary chamber 408. A second connection member 314, which is preferably, and not necessarily, a pivot bearing, is connected to the end cap 310 in axial alignment with the first pivot bearing connection member 208.

In operation of the integrated jounceshock 100" form of the compact air-bump stop 100 according to the present invention, the integrated jounceshock is located in a motor vehicle suspension at the location whereat a conventional shock absorber would be located. For example as depicted at FIG. 7, a suspension system 10" includes a control arm 14 pivotally connected to a frame 16, a spring 18, and the integrated jounceshock 100" (there being obviated a conventional bump cushion). Operation of the integrated jounceshock 100" will now be described with attention being primarily directed to FIGS. 6A through 6D.

As indicated at FIG. 6A, as a control arm undergoes jounce, the shock rod 204 causes the valved first piston 202 to move inwardly along arrow A, with the concurrent result of the oil O' is displaced from the first interior portion 402 into the oil reservoir cylinder 216, causing the pressure of the nitrogen gas G' to increase in the gas repository 212 as its volume decreases. Consequently, an increased hydraulic pressure is applied on the valved first piston in a direction opposite arrow A, while the oil meters dampingly through the valving 226 from the first interior portion 402 to the second interior portion 404 of the first section 400F of the jounceshock cylinder 400.

At FIG. 6B, the jounce of the control arm has caused the valved first piston 202 to be moved such that now the jounceshock rod seat 406 seatably abuts the jounceshock rod abutment 414 of the jounce shock rod 412.

As shown at FIG. 6C, further jounce of the control arm causes movement of the valved second piston 302. As this occurs, oil O" is metered through the valving 304 from the primary chamber 408 to the secondary chamber 410 at a predetermined flow rate based upon the pressure applied to the valved second piston by the control arm jounce, with the consequence that the gas G" in the primary and secondary chambers increases in pressure rapidly, which pressure on the valved second piston reacts against the jounce in a manner which allows for elimination of a conventional bump cushion. The elimination of a conventional bump cushion more particularly comes from the increase in total system pressure due to the displacement of the jounceshock rod 412 moving into the primary and secondary chambers total volume, which results in an exponential force versus displacement working against the area of the jounceshock rod.

As depicted at FIG. 6D, as rebound of the control arm now transpires, the shock rod 204 and valved first piston follow the rebound movement of the control arm in the direction of arrow A' (with oil O' now metering back from the second interior portion 404 to the first interior portion 402), and the valved second piston 302 independently relaxes into its rest state position of FIG. 6A as oil O" flows from the secondary chamber into the primary chamber.

Figure 8:
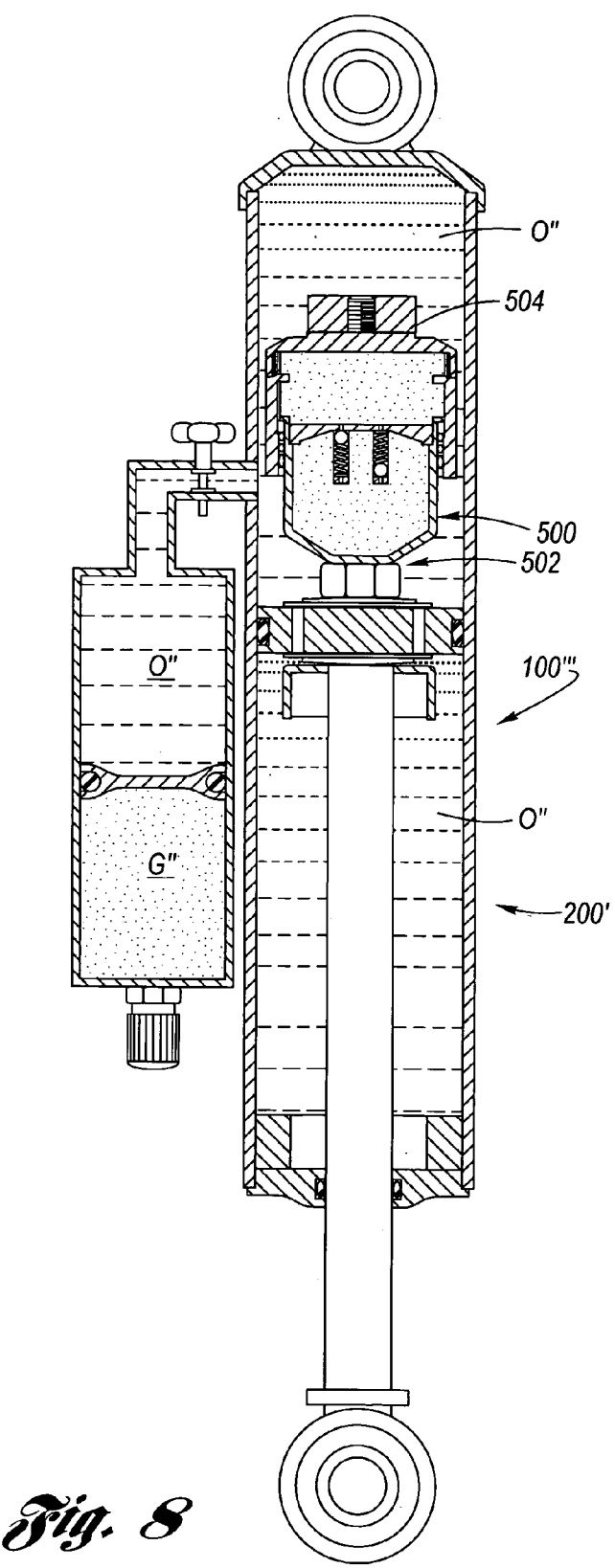
FIG. 8 is a sectional view of an alternate embodiment of integrated jounceshock according to the present invention.

As shown at FIG. 8, an alternate embodiment of the integrated jounceshock 100'" has a shock absorber component 200 as generally described and utilizes an independent jounceshock, as for preferable example generally identical to that shown and described with respect to FIGS. 3A through 4B which is adapted to provide an "energy puck" 500 in which the jounceshock would simply sit (or possibly float) within an otherwise conventional shock absorber. The valved first piston would then simply compress the "energy puck" near the end of its stroke at approach of maximum jounce. Naturally, some structural accommodations would be needed, such as for example a first abutment 502 on the first valved piston and a second abutment 504 on the end cap of the primary shell of the "energy puck", but in minor forms, and this approach could be exceedingly efficient.

The integrated jounceshock 100", 100''' is intended to provide the attributes of the compact air-bump stop (jounceshock) 100 within the real estate normally occupied by a conventional shock absorber, in that the packaging space already commanded by a production shock absorber is usable, with only slightly modified conventional hardware. The integrated jounceshock would likely require increased pivot attachment mount strength due to the added jounce capacity. However, by eliminating the need for additional mounting locations and strength requirements, overall cost and mass of the system would be significantly reduced.

Some additional structural and functional aspects of the integrated jounceshock 100", 100''' are worth mentioning.

Mounting techniques with respect to the control arm and frame preferably utilize current production standards for conventional shock absorbers, with due consideration for increased load capacities. Size indications suggest that for most applications, the integrated jounceshock can function within the typical volume usually provided in a conventional monotube shock absorber for the gas reservoir. Use of existing suspension real estate eliminates new packaging requirements. By integrating the shock absorber with a compact air-bump stop, mass is reduced and multiple installations are avoided with not only less assembly time and effort, but with less hardware and per piece cost.

Many monotube shock absorber reservoir location options are possible depending on desired packaging goals. Many forms of remote oil reservoir options are also possible, as well as opportunities for concentric cylinder reservoirs, conventional extensions in the main body with a compact air-bump stop functions in the mid-section thereof, etc. Twintube shock absorbers could use similar packaging strategies. Additionally, many chamber and interface variations are possible and only the basic form is illustrated here.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A motor vehicle suspension system, comprising:
    a frame;
    a control arm pivotally connected to said frame, said control arm pivoting including a maximum jounce; and
    a compact air-bump stop connected to said frame, said compact air-bump stop comprising:
        a substantially cup-shaped primary shell;
        a substantially cup-shaped secondary shell reversibly movable into and out of said primary shell, wherein a stop provides a predetermined maximum movement of said secondary shell out of said primary shell;
        a seal at a moving interface between said primary and secondary shells;
        a valved piston mounted to said secondary shell, said valved piston defining a primary chamber in said primary shell and a secondary chamber in said secondary shell;
        a pressurized gas filling said primary secondary chambers, said gas being mixed with oil;
        a first one-way valve mounted on said valved piston allowing the mixture to flow unidirectionally from said primary chamber to said secondary chamber; and
        a second one-way valve mounted on said valved piston allowing the mixture to flow unidirectionally from said secondary chamber to said primary chamber;
    wherein said compact air-bump stop contacts said control arm as said maximum jounce is approached;
    wherein as said jounce continues toward said maximum jounce, said secondary shell moves into said primary shell resulting in oil flow through said first one-way valve from said primary chamber to said secondary chamber such that said pressurized gas mixed with oil substantially exponentially pressurizes as the jounce continues; and
    wherein during rebound of said control arm, oil rate of reflow through said second one-way valve from said secondary chamber to said primary chamber is such that a lag in a rate of movement of said secondary shell out of said primary shell is uncoupled with respect to a rebound rate of said control arm.

2. The motor vehicle suspension system of claim 1, further comprising at least one mounting member connected to at least one of said primary and secondary shells for connecting said compact air-bump stop to said frame.

3. The motor vehicle suspension system of claim 2, further comprising at least one fill valve connected to at least one of said primary and secondary shells.

4. A shock absorber and compact air-bump stop combination, comprising:
    a cylinder having a first section and a second section;
    a shock absorber component comprising:
        a valved first piston reciprocally movable in said first section of said cylinder, said valved that piston defining a first interior portion of said first section at a first side of said valved first piston, and a second interior portion of said first section at a second side of said valved first piston;
        a shock rod connected to said valved first piston, said shock rod extending outwardly from said first section of said cylinder;
        a pressurized first oil filling said first and second interior portions;
        a first one-way first piston valve mounted on said valved first piston allowing the first oil to flow unidirectionally from said first interior portion to said second interior portion; and
        a second one-way first piston valve mounted on said valved first piston allowing the first oil to flow unidirectionally from said second interior portion to said first interior portion;
    a compact air-bump stop component located in said second section of said cylinder, said compact air-bump stop comprising:
        a substantially cup-shaped primary shell;
        a substantially cup-shaped secondary shell reversibly movable into and out of said primary shell, wherein a stop provides a predetermined maximum movement of said secondary shell out of said primary shell;
        a seal at a moving interface between said primary and secondary shells;
        a valved second piston mounted to said secondary shell, said valved second piston defining a primary chamber in said primary shell and a secondary chamber in said secondary shell;

a pressurized gas filling said primary and secondary chambers, said gas being mixed with oil;

a first one-way second piston valve mounted on said valved second piston allowing the mixture to flow unidirectionally from said primary chamber to said secondary chamber; and a second one-way second piston valve mounted on said valved second piston allowing the mixture to flow unidirectionally from said secondary chamber to said primary chamber;

wherein said shock absorber component acts as a shock absorber in response to jounce and rebound movements of said shock rod, and wherein when at least a predetermined amount of jounce occurs, said valve first piston abuts one of said primary and secondary shells causing said compact air-bump stop component to compress, resulting in said pressurized gas mixed with oil substantially exponentially pressurizing and thereby function as an air-bump stop so as to react forceably against the jounce, and wherein during a rebound subsequent to the jounce, said compact air bump stop component expands at a predetermined lag rate which is uncoupled with respect to the rebound movement of said shock rod.

5. The combination of claim 4, further comprising:

a first mount member connected to a distal end of said shock rod; and a second mount member connected to said cylinder opposite said shock rod.

* * * * *